United States Patent
Kim

(10) Patent No.: US 9,337,715 B2
(45) Date of Patent: May 10, 2016

(54) BOOST CONVERTER WITH FIRST AND SECOND MODES BASED UPON THE INPUT VOLTAGE

(71) Applicant: Samsung Electro-Mechanics Co., Ltd., Suwon, Gyunggi-do (KR)

(72) Inventor: Chong Eun Kim, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 189 days.

(21) Appl. No.: 13/941,026

(22) Filed: Jul. 12, 2013

(65) Prior Publication Data

US 2014/0312861 A1 Oct. 23, 2014

(30) Foreign Application Priority Data

Apr. 18, 2013 (KR) .................. 10-2013-0043137

(51) Int. Cl.
- *H02M 3/158* (2006.01)
- *H02M 1/10* (2006.01)
- *H02M 1/42* (2007.01)
- *H02M 1/00* (2006.01)

(52) U.S. Cl.
CPC .............. *H02M 1/10* (2013.01); *H02M 1/4225* (2013.01); *H02M 3/1584* (2013.01); *H02M 2001/0067* (2013.01); *H02M 2001/0083* (2013.01); *Y02B 70/126* (2013.01)

(58) Field of Classification Search
CPC ............. H02M 2001/0067; H02M 2001/0083; H02M 3/158; H02M 3/1584; H02M 2003/1586; H02M 3/1582; H02M 2001/0048; H02M 2001/0054; H02M 1/4225

See application file for complete search history.

(56) References Cited

U.S. PATENT DOCUMENTS

| 6,323,626 B1 | 11/2001 | Raiser |
| 6,924,630 B1 * | 8/2005 | Pacala .................. H02M 1/34 323/207 |

(Continued)

FOREIGN PATENT DOCUMENTS

| JP | 2001-268898 A | 9/2001 |
| KR | 10-2006-0107396 A | 10/2006 |

OTHER PUBLICATIONS

Office Action issued on Feb. 19, 2014 in the corresponding Korean patent application No. 10-2013-0043137.

(Continued)

*Primary Examiner* — Harry Behm
(74) *Attorney, Agent, or Firm* — McDermott Will & Emery LLP

(57) ABSTRACT

There is provided a power supply, including, a boost converter unit including a first boost converter having a first inductor, a first diode, and a first switching element, and a second boost converter having a second inductor, a second diode and a second switching element, an input voltage sensing unit sensing an input voltage applied to the boost converter unit, a control unit selecting one of a first boost mode in which current is divided between the first inductor and the second inductor, based on the input voltage, and a second boost mode in which current flows through the first inductor and the second inductor in this order, based on the input voltage, and a switching unit selecting one of the first boost mode and the second boost mode, based on the selection of the control unit.

10 Claims, 6 Drawing Sheets

(56) References Cited

U.S. PATENT DOCUMENTS

2012/0105040 A1* 5/2012 Leipold et al. ............... 323/284
2014/0347900 A1* 11/2014 Ura ............................. 363/89

OTHER PUBLICATIONS

Fairchild FAN9612 Interleaved Dual BCM PFC Controllers, 2008 Fairchild Semiconductor Corporation, www.fairchildsemi.com, Rev. 1.1.7, Feb. 2013.

* cited by examiner

BOOST CONVERTER WITH FIRST AND SECOND MODES BASED UPON THE INPUT VOLTAGE

CROSS-REFERENCE TO RELATED APPLICATIONS

This application claims the priority of Korean Patent Application No. 10-2013-0043137 filed on Apr. 18, 2013, in the Korean Intellectual Property Office, the disclosure of which is incorporated herein by reference.

BACKGROUND OF THE INVENTION

1. Field of the Invention

The present invention relates to a power supply, and more particularly, to a power supply having optimized efficiency through variations in input voltage.

2. Description of the Related Art

Recently, a variety of power supplies, capable of stepping up a lower DC voltage for use in fuel cell- or battery-based electric driving systems, semiconductor manufacturing equipment, large display devices, ultrasonic and x-ray apparatuses, and so on, have been developed.

Among such power supplies, a boost converter is a representative power supply.

Generally, a boost converter includes a boost inductor, in which loss may occur. Types of loss occurring in the boost inductor include conduction loss and core loss.

In particular, in the case of a relatively low input voltage, in terms of overall loss occurring in the boost inductor, conduction loss occupies a large portion thereof. Further, in the case of a relatively high input voltage, in terms of overall loss occurring in the boost inductor, core loss occupies a large portion thereof.

What is therefore required is a method capable of providing significantly enhanced efficiency in a power supply through variations in voltage input thereto.

The Related Art Documents relate to converters, but are silent with regard to configurations for optimizing the efficiency of a power supply through variations in input voltage.

RELATED ART DOCUMENT

1) Korean Patent Laid-Open Publication No. 2006-0107396
2) Japanese Patent Laid-Open Publication No. JP 2001-0268898

SUMMARY OF THE INVENTION

An aspect of the present invention provides a power supply having significantly enhanced efficiency through variations in input voltage.

According to an aspect of the present invention, there is provided a power supply, including: a boost converter unit including: a first boost converter having a first inductor, a first diode, and a first switching element, and a second boost converter having a second inductor, a second diode and a second switching element, an input voltage sensing unit sensing an input voltage applied to the boost converter unit; a control unit selecting one of a first boost mode in which current is divided between the first inductor and the second inductor, based on the input voltage, and a second boost mode in which current flows through the first inductor and the second inductor in this order, based on the input voltage; and a switching unit selecting one of the first boost mode and the second boost mode, based on the selection of the control unit.

The control unit may select the second boost mode when the input voltage has a level equal to, or higher than, a predetermined level.

The control unit may select the first boost mode when the input voltage has a level lower than the predetermined level.

One of the first switching element and the second switching element in the boost converter unit may perform a switching operation in the second boost mode.

According to an aspect of the present invention, there is provided a power supply, including: a boost converter unit operated in one of a first boost mode in which current is divided between a first inductor and a second inductor and a second boost mode in which current flows through the first inductor and the second inductor in this order; an input voltage sensing unit sensing an input voltage applied to the converter unit; and a control unit controlling the boost converter unit to operate in one of the first boost mode and the second boost mode, based on the input voltage.

According to an aspect of the present invention, there is provided a power supply, including: a power input unit; a first boost converter including: a first inductor of which one terminal is connected to one terminal of the power input unit via a switching unit, a first diode of which one terminal is connected to the other terminal of the first inductor, and a first switching element connected between the other terminal of the power input unit and the other terminal of the first inductor; a second boost converter including: a second inductor of which one terminal is connected to one terminal of the power input unit via the switching unit, a second diode of which one terminal is connected to the other terminal of the first inductor, and a second switching element connected between the other terminal of the power input unit and the other terminal of the second inductor; an input voltage sensing unit sensing an input voltage supplied by the power input unit; and a control unit selecting one of a first boost mode in which the one terminal of the power input unit is connected to the one terminal of the first inductor and a second boost mode in which the other terminal of the first inductor is connected to the one terminal of the power input unit, based on the input voltage.

The control unit may select the second boost mode when the input voltage has a level equal to, or higher than, a predetermined level.

The control unit may select the first boost mode when the input voltage has a level lower than the predetermined level.

The second switching element in the boost converter unit may perform a switching operation in the second boost mode.

According to an aspect of the present invention, there is provided a power supply, including: a power input unit; a first boost converter including: a first inductor of which one terminal is connected to one terminal of the power input unit, a first diode of which one terminal is connected to the other terminal of the first inductor, and a first switching element connected between the other terminal of the power input unit and the other terminal of the first inductor; a second boost converter including: a second inductor of which one terminal is connected to one terminal of the power input unit via a switching unit, a second diode of which one terminal is connected to the other terminal of the second inductor, and a second switching element connected between the other terminal of the power input unit and the other terminal of the second inductor; an input voltage sensing unit sensing an input voltage supplied by the power input unit; and a control unit selecting one of a first boost mode in which the one terminal of the power input unit is connected to the one terminal of the second inductor, based on the input voltage, and a second boost mode in which the other terminal of the first inductor is connected to the one terminal of the second inductor, based on the input voltage.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
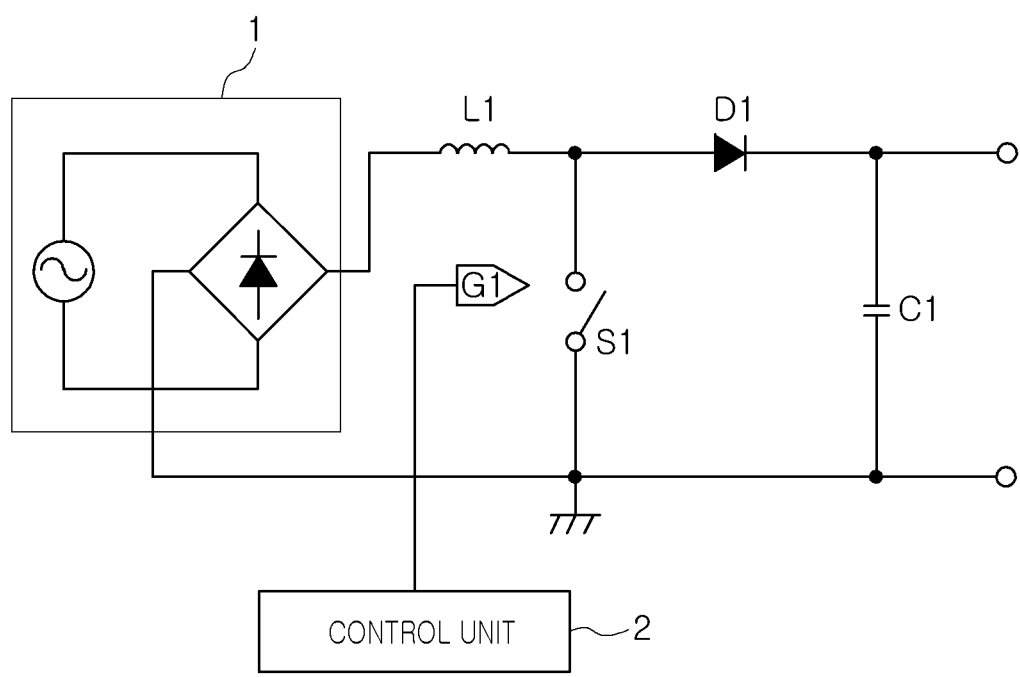
FIG. 1 is a circuit diagram of a general boost converter.

FIG. 1 is a circuit diagram of a general boost converter.

As shown in FIG. 1, the boost converter may include a power input unit 1, an inductor L1, a diode D1, a switching element S1, and an output capacitor C1. A boost converter is a representative DC to DC converter that may step up an input voltage to generate a stable output voltage.

The power input unit 1 may rectify an alternating current voltage to supply power source.

The inductor L1 serves to step the voltage supplied by the power input unit 1 up to a predetermined level, and may be connected to one terminal of the power input unit 1.

The diode D1 is connected to the inductor L1 in series and may prevent a counter-current corresponding to a direct current voltage. Further, the output of the diode D1, i.e., the cathode, may be connected to an output terminal.

The switching element S1 is connected in parallel between the inductor L1 and the diode D1, and is turned on or off in response to a control signal G1 supplied from the outside so that it may transmit the stepped-up direct current voltage to the output terminal or may block the stepped-up direct current voltage.

More specifically, a control unit 2 may apply the switching signal G1 to the switching element S1 to control the switching element S1.

When the switching element S1 is turned on, a voltage from the power input unit 1 is applied across both terminals of the inductor L1 so that voltage is charged, and an inductor current flows into the switching element S1.

When the switching element S1 is turned off, the voltage charged in the inductor L1 may be transferred to the output terminal through the diode D1.

As the switching element, an insulated gate bipolar transistor (IGBT), a metal oxide semiconductor field-effect transistor (MOS-FET), and a bipolar junction transistor (BJT) or the like may be used.

The output capacitor C1 is connected to the output terminal in parallel and may stabilize the voltage output from the diode D1.

As described above, in the general boost converter, the boost inductor L1 is fixed thereto.

Figure 2:
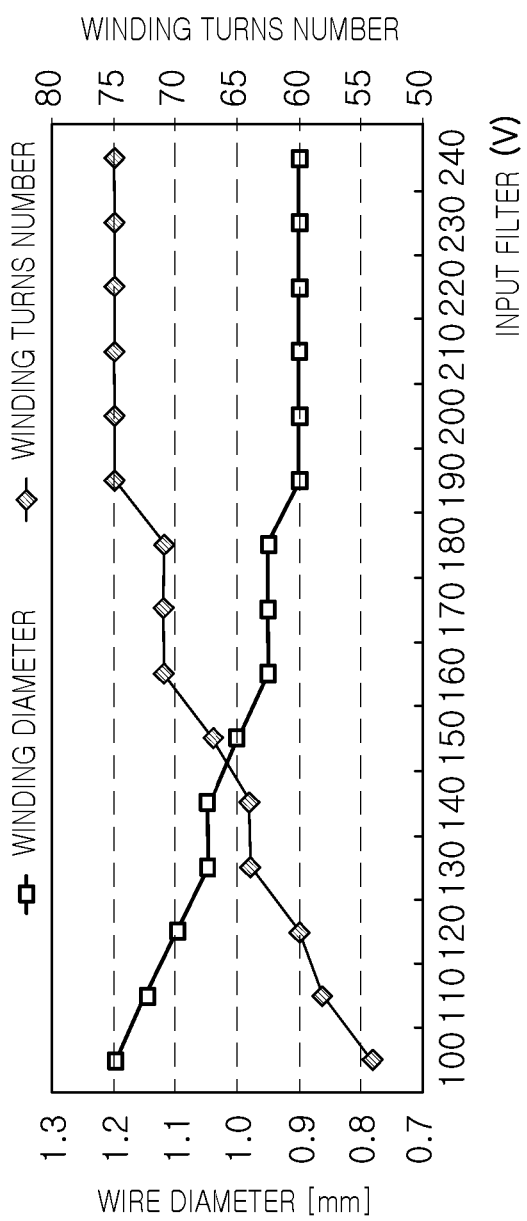
FIG. 2 is a graph for illustrating improved design conditions of a boost inductor to input voltage conditions.

FIG. 2 is a graph for illustrating improved design conditions of a boost inductor to input voltage conditions.

Referring to FIG. 2, in the case of a lower input voltage, conduction loss makes up a relatively large portion of the total loss occurring in a boost inductor. Therefore, in order to reduce the amount of conduction loss in the total loss occurring in the boost inductor, the boost inductor provided with a conductor having a relatively large diameter, and thus having fewer windings, may be used.

Further, in the case of a relatively high input voltage, core loss makes up a large portion of the total loss occurring in a boost inductor. Therefore, in order to reduce the amount of core loss in the total loss occurring in the boost inductor, the boost inductor provided with a conductor having a relatively small diameter, and thus able to be provided with more windings, may be used.

That is, when a boost inductor is designed for maximum efficiency at a higher input voltage, conduction loss is increased at a lower input voltage so that it is difficult to obtain a design for effective heat dissipation.

On the contrary, when a boost inductor is designed in consideration of heat dissipation at a lower input voltage, the efficiency thereof with a higher input voltage is lowered.

Figure 3:
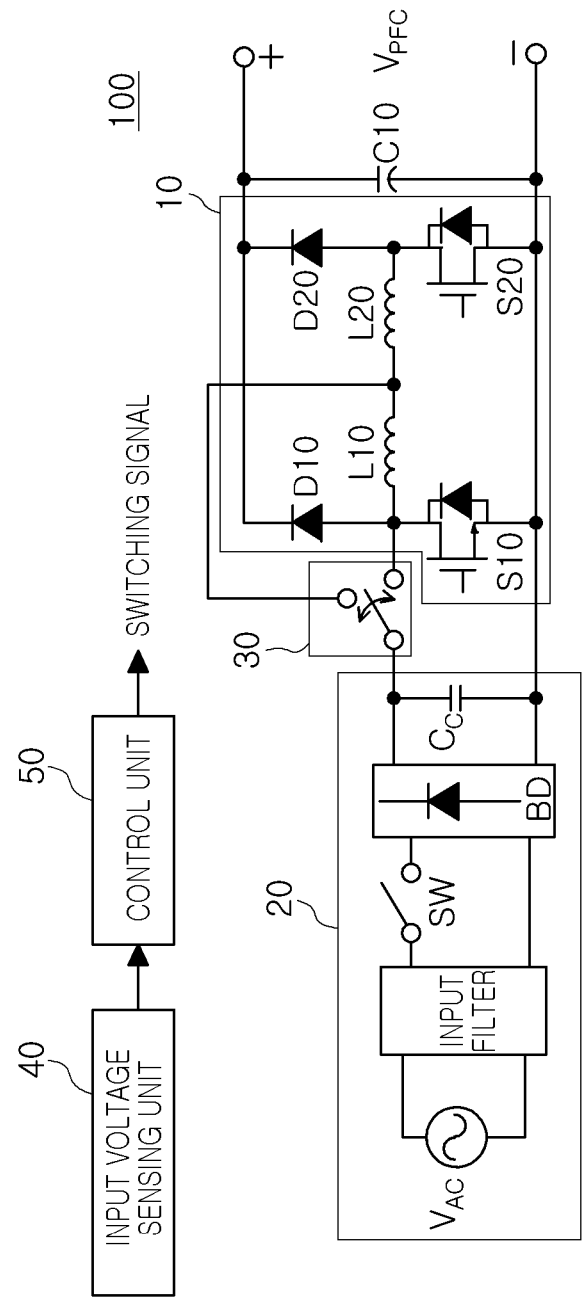
FIG. 3 is a diagram of a power supply according to an embodiment of the present invention.

FIG. 3 is a diagram of a power supply according to an embodiment of the present invention.

Referring to FIG. 3, the power supply may include a power input unit 20, a boost converter unit 10, a switching unit 30, an input voltage sensing unit 40, and a control unit 50.

The power input unit 20 may rectify an alternating current voltage to supply input voltage. For example, the power input unit 20 may include an input filter, a switching element SW, a bridge diode and the like, and may rectify an alternating current voltage to provide an input voltage.

The boost converter unit 10 may include a first boost converter and a second boost converter. The first boost converter may include a first inductor L10, a first diode D10, and a first switching element S10. The second boost converter may include a second inductor L10, a second diode D20, and a second switching element S20.

The boost converter unit 10 may be operated in one of two modes, a first boost mode and a second boost mode.

Here, the first boost mode refers to a mode in which current flow in a boost converter is divided between the first inductor L10 and the second inductor L20. Further, the second boost mode refers to a mode in which current in a boost converter flows through the first inductor L10 and the second inductor L20 in this order.

In addition, a mode in which a plurality of boost converters are connected in parallel to the power input unit 20 in the boost converter unit 10 and operate may be referred to the first boost mode. That is, in the first boost mode, the first inductor L10, the first diode D10, and the first switching element S10 may form a single boost converter, and the second inductor L20, the second diode D20, and the second switching element S20 may form a single boost converter.

In addition, a mode in which a single boost converter operates in the boost converter unit 10 may be referred to the second boost mode. In the second boost mode, the first inductor L10, the second inductor L20, the second diode D20, and the second switching element S20 may form a boost converter.

Referring to FIG. 3, one terminal of the first inductor L10 may be connected to one terminal of the power input unit 20 via the switching unit 30. Further, one terminal of the first diode D10 may be connected to the other terminal of the first inductor L10. Further, the first switching element S10 may be connected between the other terminal of the power input unit 20 and the other terminal of the first inductor L10.

One terminal of the second inductor L20 may be connected to one terminal of the power input unit 20 via the switching unit 30. Further, one terminal of the second diode D20 may be connected to the other terminal of the second inductor L20. Further, the second switching element S20 may be connected between the other terminal of the power input unit 20 and the other terminal of the second inductor L20.

The input voltage sensing unit 40 may sense the input voltage applied to the boost converter unit 10 by the power input unit.

The control unit 50 may select any one of the first boost mode and the second boost mode, based on the input voltage. Specifically, the control unit 50 may select the second boost mode when the input voltage has a level equal to, or higher than, a predetermined level. Further, the control unit 50 may select the first boost mode when the input voltage has a level lower than a predetermined level. The control unit 50 may output a switching signal for controlling the switching unit 30 based on the selection.

The switching unit 30 may perform a switching operation such that the boost converter unit 10 may operate in the first boost mode or the second boost mode, based on the switching signal from the control unit 50.

Figure 4A:
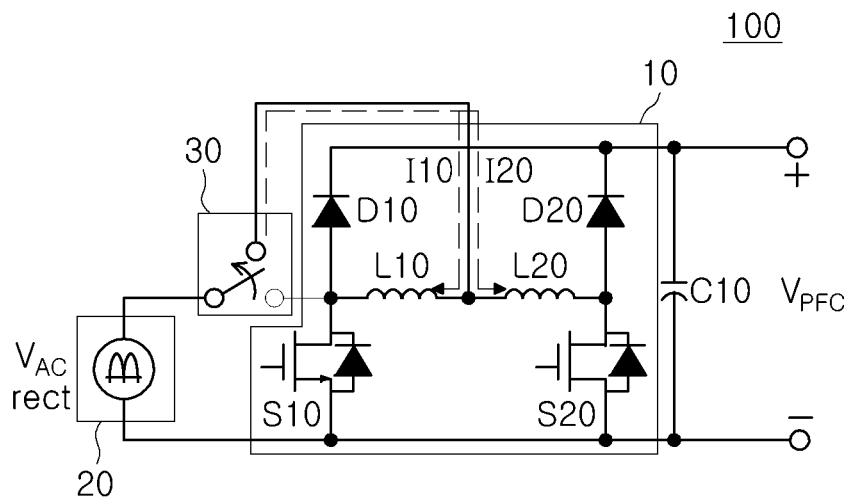
FIG. 4A is a circuit diagram illustrating a first boost mode of the power supply shown in FIG. 3.
Figure 4B:
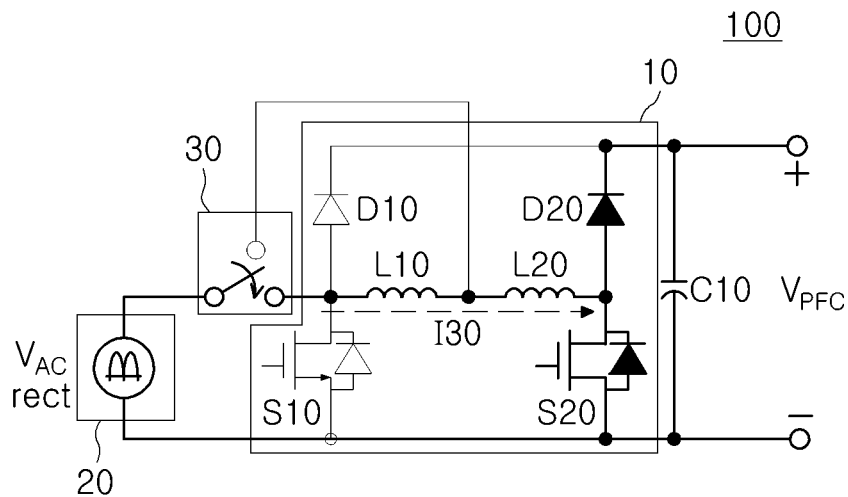
FIG. 4B is a circuit diagram illustrating a second boost mode of the power supply shown in FIG. 3.

FIG. 4A is a circuit diagram illustrating the first boost mode of the power supply shown in FIG. 3. FIG. 4B is a circuit diagram illustrating the second boost mode of the power supply shown in FIG. 3.

The power supply according to an embodiment of the present invention may be operated in the first boost mode upon receiving a lower input voltage.

Referring to FIG. 4A, when the control unit 50 selects the first boost mode, the switching unit may connect one terminal of the power input unit 20 to one terminal of the first inductor L10.

In the first boost mode, the first boost converter L10, D10 and S10, and the second boost converter L20, D20 and S20 may be connected to the power input unit 20 in parallel. In addition, the first boost converter and the second boost converter may be operated in an interleaved manner.

The current flowing through the boost converter unit 10 may be divided between the first inductor L10 and the second inductor L20.

Here, a first current i10 may flow through the first inductor L10 and a second current i20 may flow through the second inductor L20.

According to the embodiment of the present invention, in the first boost mode, the amount of the current flowing through the boost inductors L10 and L20 is reduced, and thus conduction loss in the inductors may be reduced. In addition, according to the embodiment of the present invention, ripples in the input current may also be reduced.

The power supply according to the embodiment of the present invention may be operated in the second boost mode upon receiving a higher input voltage.

Referring to FIG. 4B, when the control unit 50 selects the second boost mode, the switching unit may connect one terminal of the power input unit 20 to the other terminal of the first inductor L10.

In the second boost mode, the first inductor L10, the second inductor L20, the second diode D20, and the second switching element S20 may form a single boost converter. During the process of stepping-up voltage, the first switching element S10 may not perform the switching operation and only the second switching element S20 performs the switching operation.

The current flowing through the boost converter unit 10 may be flow through the first inductor L10 and the second inductor L20 in this order.

Here, a current i30 may flow through the first inductor L10 and the second inductor L20.

According to the embodiment of the present invention, in the second boost mode, the voltage applied to the respective boost inductors L10 and L20 are halved, and thus core loss in the inductor may be significantly reduced.

Furthermore, since the first switching element S10 does not perform a switching operation, switching loss is reduced and thus the efficiency of the power supply may be improved.

In the case of a lower input voltage, conduction loss occupies a relatively large portion of the entire loss occurring in a boost inductor. Further, in the case of a higher input voltage, core loss occupies a relatively large portion of the entire loss occurring in a boost inductor.

According to the embodiment of the present invention, the power supply may reduce conduction loss at a lower input voltage, and may reduce core loss at a higher input voltage.

Therefore, the power supply according to the embodiment of the present invention may achieve significantly enhanced efficiency for both lower input voltage and higher input voltage.

Figure 5:
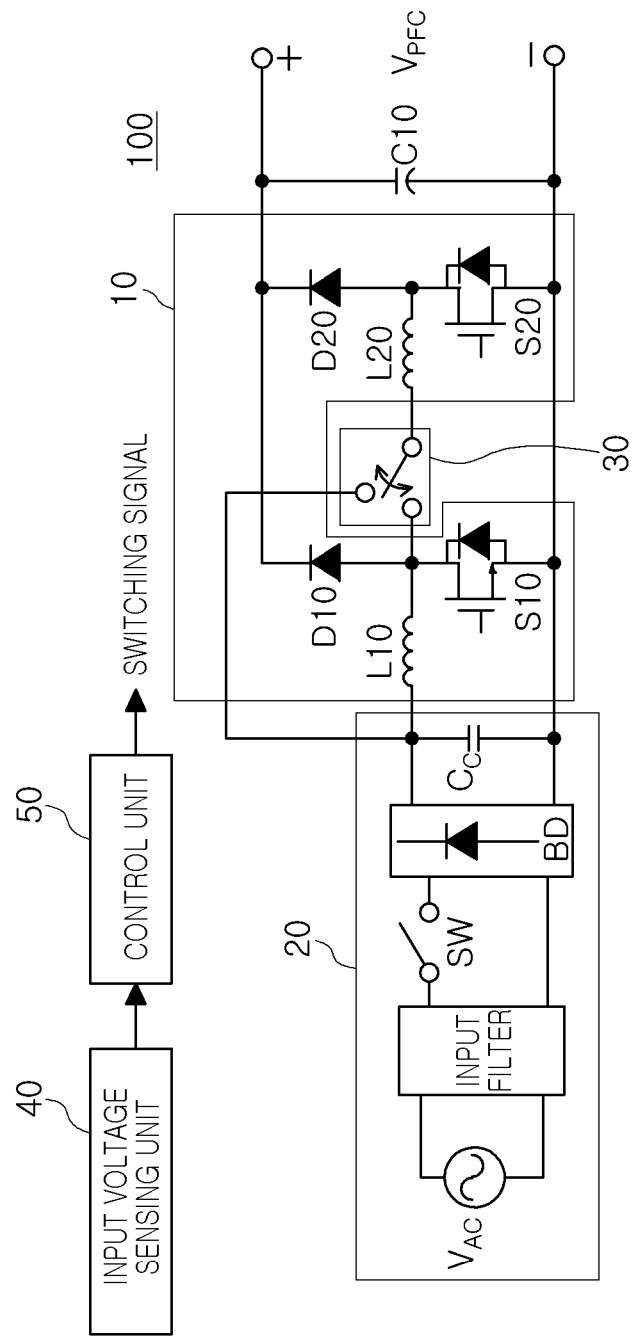
FIG. 5 is a diagram of a power supply according to another embodiment of the present invention.

FIG. 5 is a diagram of a power supply according to another embodiment of the present invention.

Referring to FIG. 5, the power supply may include a power input unit 20, a boost converter unit 10, a switching unit 30, an input voltage sensing unit 40, and a control unit 50.

The power supply shown in FIG. 5 is substantially identical to the power supply shown in FIG. 4 except for the arrangement of elements in the boost converter unit 10, and, therefore, redundant descriptions will be omitted.

Referring to FIG. 5, one terminal of the first inductor L10 may be connected to one terminal of the power input unit 20. Further, one terminal of the first diode D10 may be connected to the other terminal of the first inductor L10. Further, the first switching element S10 may be connected between the other terminal of the power input unit 20 and the other terminal of the first inductor L10.

One terminal of the second inductor L20 may be connected to one terminal of the power input unit 20 via the switching unit 30. Further, one terminal of the second diode D20 may be connected to the other terminal of the second inductor L20. Further, the second switching element S20 may be connected between the other terminal of the power input unit 20 and the other terminal of the second inductor L20.

The first inductor L10 and the second inductor L20 may share a core portion. In this configuration, the space in the power supply may be efficiently utilized. The first inductor L10 and the second inductor L20 may be inductively coupled.

Figure 6A:
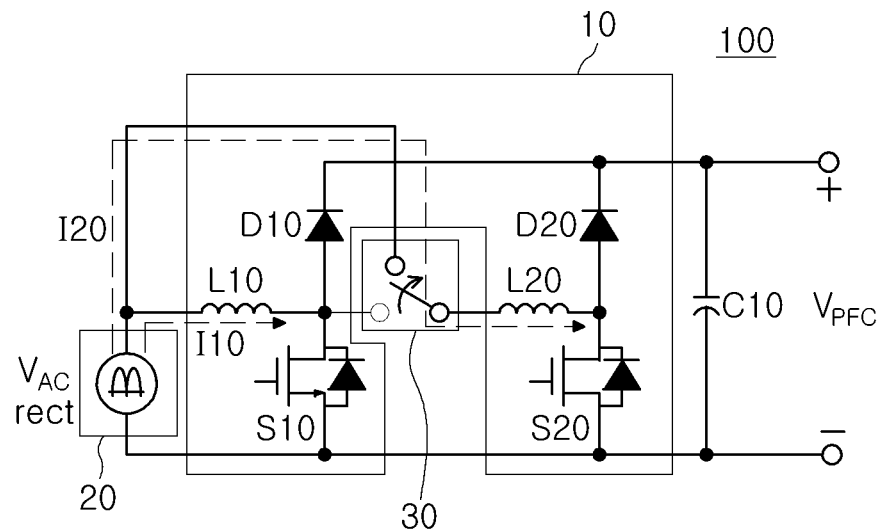
FIG. 6A is a circuit diagram illustrating 1 first boost mode of the power supply shown in FIG. 5.
Figure 6B:
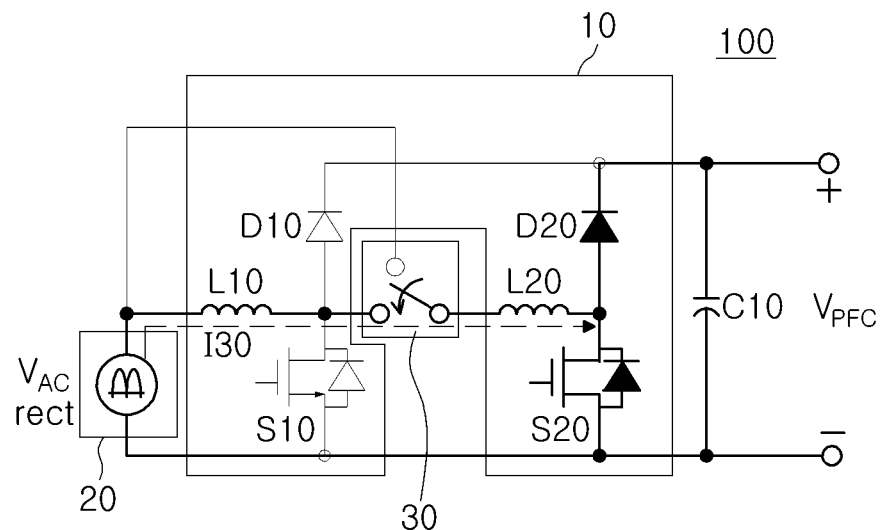
FIG. 6B is a circuit diagram illustrating a second boost mode of the power supply shown in FIG. 5.

FIG. 6A is a circuit diagram illustrating the first boost mode of the power supply shown in FIG. 5. FIG. 6B is a circuit diagram illustrating the second boost mode of the power supply shown in FIG. 5.

The power supply according to an embodiment of the present invention may be operated in the first boost mode upon receiving a lower input voltage.

Referring to FIG. 6A, when the control unit 50 selects the first boost mode, the switching unit may connect one terminal of the power input unit 20 to one terminal of the second inductor L10.

In the first boost mode, the first boost converter L10, D10 and S10, and the second boost converter L20, D20 and S20 may be connected to the power input unit 20 in parallel. In addition, the first boost converter and the second boost converter may be operated in an interleaved manner.

The current flowing through the boost converter unit 10 may be divided between the first inductor L10 and the second inductor L20.

Here, a first current i10 may flow through the first inductor L10 and a second current i20 may flow through the second inductor L20.

According to the embodiment of the present invention, in the first boost mode, the amount of the current flowing through the boost inductors L10 and L20 are reduced, and thus conduction loss in the inductors may be reduced. In addition, according to the embodiment of the present invention, ripples in the input current may also be reduced.

The power supply according to the embodiment of the present invention may be operated in the second boost mode upon receiving a higher input voltage.

Referring to FIG. 6B, when the control unit 50 selects the second boost mode, the switching unit 30 may connect the other terminal of the first inductor L10 to the one terminal of the second inductor L20.

In the second boost mode, the first inductor L10, the second inductor L20, and the second diode D20, and the second switching element S20 may form a single boost converter. During the process of stepping-up voltage, the first switching element S10 may not perform the switching operation and only the second switching element S20 performs the switching operation.

The current flowing through the boost converter unit 10 may flow through the first inductor L10 and the second inductor L20 in this order.

Here, a current i30 may flow through the first inductor L10 and the second inductor L20.

According to the embodiment of the present invention, in the second boost mode, the voltage applied to the respective boost inductors L10 and L20 are halved, and thus core loss in the inductor may be significantly reduced.

Furthermore, since the first switching element S10 does not perform a switching operation, switching loss is reduced and thus the efficiency of the power supply may be improved.

As described above, according to the embodiment of the present invention, the power supply may reduce conduction loss at a lower input voltage, and may reduce core loss at a higher input voltage.

Additionally, the power supply according to the embodiment of the present invention may achieve significantly enhanced efficiency for both lower input voltage and higher input voltage.

As set forth above, according to embodiments of the present invention, the efficiency of a power supply may be significantly enhanced through variations in input voltage.

While the present invention has been shown and described in connection with the embodiments, it will be apparent to those skilled in the art that modifications and variations can be made without departing from the spirit and scope of the invention as defined by the appended claims.

What is claimed is:

1. A power supply, comprising:
a boost converter unit including a first boost converter having a first inductor, a first diode, and a first switching element, and a second boost converter having a second inductor, a second diode and a second switching element;
an input voltage sensing unit sensing an input voltage applied to the boost converter unit;
a control unit selecting one of a first boost mode in which current is divided between the first inductor and the second inductor, based on the input voltage, and a second boost mode in which current flows through the first inductor and the second inductor in this order, based on the input voltage; and
a switching unit of which one terminal is connected to a connecting node of the first inductor, the first diode, and the first switching element and the switching unit selecting one of the first boost mode and the second boost mode, based on the selection of the control unit,
wherein the control unit selects:
the second boost mode when the input voltage has a level equal to, or higher than, a predetermined level, or
first boost mode when the input voltage has a level lower than a predetermined level.

2. The power supply of claim 1 wherein the control unit selects the second boost mode when the input voltage has a level equal to, or higher than, a predetermined level.

3. The power supply of claim 1 wherein the control unit selects the first boost mode when the input voltage has a level lower than a predetermined level.

4. The power supply of claim 1, wherein the first switching element in the boost converter does not perform a switching operation and the second switching element in the boost converter unit performs a switching operation, in the second boost mode.

5. A power supply, comprising:
a boost converter unit operated in one of a first boost mode in which current is divided between a first inductor and a second inductor and a second boost mode in which current flows through the first inductor and the second inductor in this order;
an input voltage sensing unit sensing an input voltage applied to the converter unit;
a control unit controlling the boost converter unit to operate in one of the first boost mode and the second boost mode, based on the input voltage; and
a switching unit of which one terminal is connected to a connecting node of a first inductor, a first diode, and a first switching element,
wherein the control unit selects:
the second boost mode when the input voltage has a level equal to, or higher than, a predetermined level, or
the first boost mode when the input voltage has a level lower than a predetermined level.

6. A power supply, comprising:
a power input unit;
a first boost converter including a first inductor of which one terminal is connected to one terminal of the power input unit via a switching unit, a first diode of which one terminal is connected to the other terminal of the first inductor, and a first switching element connected between the other terminal of the power input unit and the other terminal of the first inductor;
a second boost converter including a second inductor of which one terminal is connected to one terminal of the power input unit via the switching unit, a second diode of which one terminal is connected to the other terminal of the second inductor, and a second switching element connected between the other terminal of the power input unit and the other terminal of the second inductor;

an input voltage sensing unit sensing an input voltage supplied by the power input unit; and a control unit selecting one of a first boost mode in which the one terminal of the power input unit is connected to the one terminal of the first inductor, based on the input voltage, and a second boost mode in which the other terminal of the first inductor is connected to the one terminal of the power input unit, based on the input voltage.

7. The power supply of claim 6, wherein the control unit selects the second boost mode when the input voltage has a level equal to, or higher than, a predetermined level.

8. The power supply of claim 6, wherein the control unit selects the first boost mode when the input voltage has a level lower than a predetermined level.

9. The power supply of claim 6, wherein the second switching element in the boost converter unit performs a switching operation in the second boost mode.

10. A power supply, comprising:
a power input unit;
a first boost converter including a first inductor of which one terminal is connected to one terminal of the power input unit, a first diode of which one terminal is connected to the other terminal of the first inductor, and a first switching element connected between the other terminal of the power input unit and the other terminal of the first inductor;

a second boost converter including a second inductor of which one terminal is connected to one terminal of the power input unit via a switching unit of which one terminal is connected to a connecting node of the first inductor, the first diode, and the first switching element, a second diode of which one terminal is connected to the other terminal of the second inductor, and a second switching element connected between the other terminal of the power input unit and the other terminal of the second inductor;

an input voltage sensing unit sensing an input voltage supplied by the power input unit; and a control unit selecting one of a first boost mode in which the one terminal of the power input unit is connected to the one terminal of the second inductor, based on the input voltage, and a second boost mode in which the other terminal of the first inductor is connected to the one terminal of the second inductor, based on the input voltage, wherein the control unit selects:
the second boost mode when the input voltage has a level equal to, or higher than, a predetermined level, or
the first boost mode when the input voltage has a level lower than a predetermined level.

* * * * *